United States Patent [19]

Moe et al.

[11] 4,315,702
[45] Feb. 16, 1982

[54] METHOD FOR ALIGNING TWO PIPELINE ENDS AND APPARATUS FOR CARRYING OUT THE METHOD

[75] Inventors: Per J. Moe, Nesbru; Helge Carling; Leif H. Eriksen, both of Oslo, all of Norway

[73] Assignee: Odd Berg, Tromsø, Norway

[21] Appl. No.: 93,877

[22] Filed: Nov. 13, 1979

Related U.S. Application Data

[63] Continuation of Ser. No. 903,216, May 5, 1978, abandoned.

[30] Foreign Application Priority Data

May 9, 1977 [NO] Norway ............................... 771626

[51] Int. Cl.³ ............................................ F16L 1/00
[52] U.S. Cl. .................................. 405/170; 405/158; 405/169
[58] Field of Search ............... 405/168, 169, 170, 188, 405/189, 154, 171

[56] References Cited

U.S. PATENT DOCUMENTS

| | | |
|---|---|---|
| 3,204,417 | 9/1965 | Robley ............................... 405/170 |
| 3,267,682 | 8/1966 | Robley ............................... 405/170 |
| 3,508,410 | 4/1970 | Lynch ................................ 405/188 |
| 3,578,233 | 5/1971 | Meister .......................... 405/170 X |
| 3,658,231 | 4/1972 | Gilman ........................... 405/170 X |
| 3,785,160 | 1/1974 | Banjavich et al. ................. 405/170 |
| 4,014,180 | 3/1977 | Kelly et al. ........................ 405/170 |
| 4,028,903 | 6/1977 | Dietrich ............................. 405/170 |
| 4,091,514 | 5/1978 | Motes-Conners et al. ..... 405/170 X |
| 4,109,480 | 8/1978 | Somner ............................. 405/170 |
| 4,171,175 | 10/1979 | Nobileau et al. ................... 405/170 |
| 4,218,158 | 8/1980 | Tesson ............................... 405/170 |

Primary Examiner—Dennis L. Taylor
Attorney, Agent, or Firm—Holman & Stern

[57] ABSTRACT

In a method and an apparatus for aligning the ends of two submerged pipelines to be jointed, the apparatus which is equipped with means for displacing and aligning the pipe ends, is allowed to be displaced relative to the pipe ends and the bottom of the sea during the alignment operation. The restraining force developed when the displacement and alignment means are actuated, is used to displace the frame relative to the base and the pipe ends, so as to allow the frame and the pipe ends to adopt a final position in which the finished aligned pipe ends define a curve having the largest possible radius.

12 Claims, 12 Drawing Figures

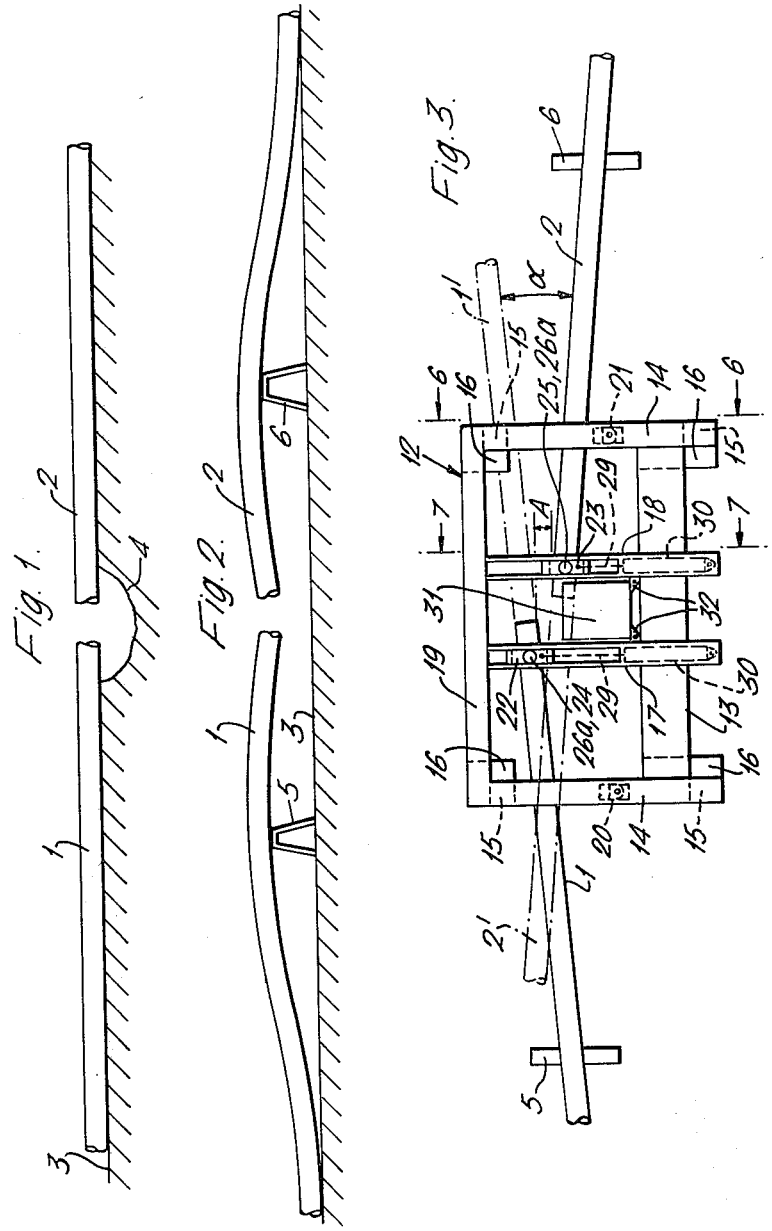

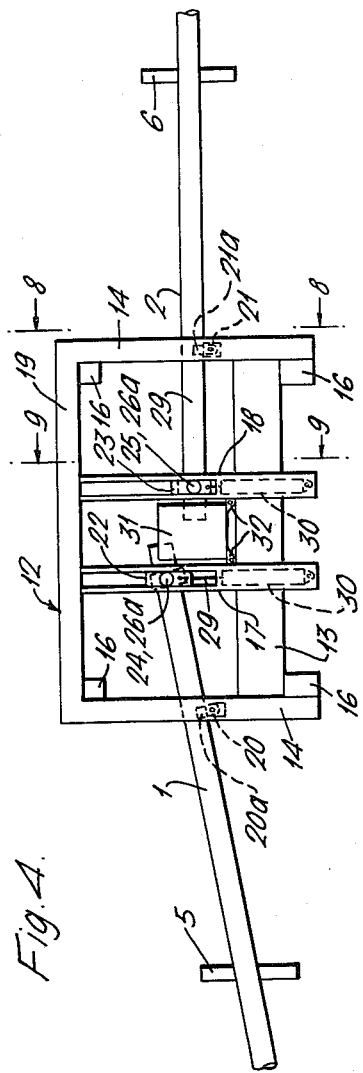

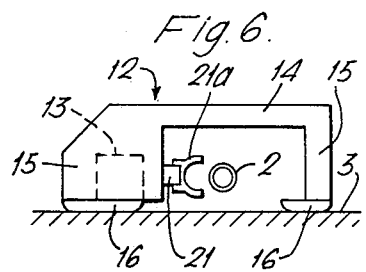
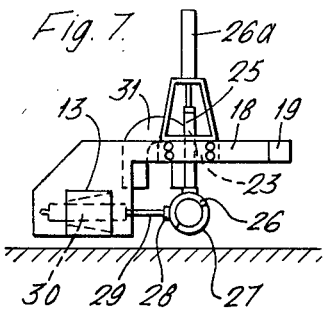
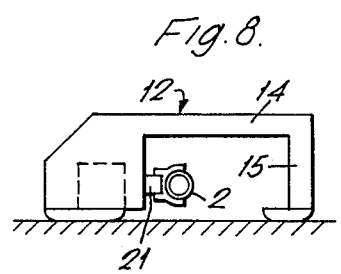
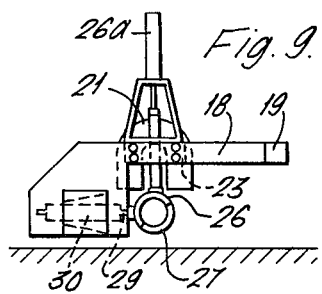
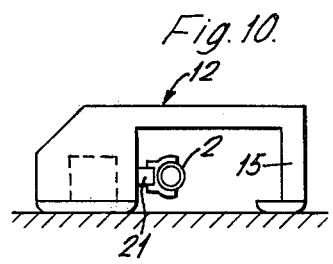
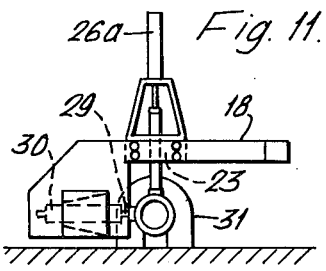
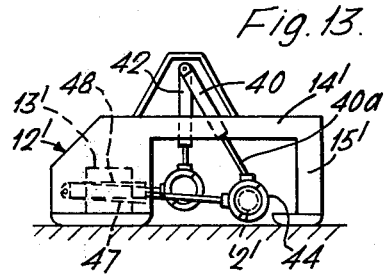
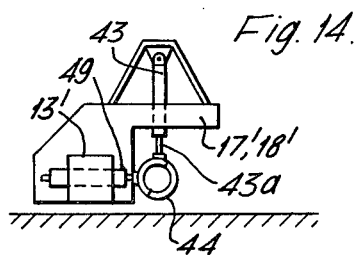

METHOD FOR ALIGNING TWO PIPELINE ENDS AND APPARATUS FOR CARRYING OUT THE METHOD

This is a continuation of application Ser. No. 903,216, filed May 5, 1978, now abandoned.

BACKGROUND OF THE INVENTION

1. Field of the Art

The present invention relates to a method for aligning two pipeline ends, preferably two pipeline ends located on the bottom of the sea, by using a frame open towards the bottom, which frame is brought in position above the pipeline ends and which is equipped with means for displacing and aligning the pipe ends.

The invention also relates to an apparatus for carrying out the method.

2. Statement of Prior Art

The alignment of two pipeline ends is an operation which often occurs in connection with laying and/or repair of pipelines in deep water. However, it is to be understood that the method and apparatus according to the invention not necessarily is associated with subsurface pipelines, but also with pipelines following a line ashore. However, the method and the apparatus of the invention will be described with reference to sub-surface pipelines, the invention primarily being contemplated for use in marine environment.

Pipelines which are laid out in deep water will generally be laid out in long continuous lengths. However, during the laying operation bad weather may occur, so that the laying must be interrupted and when commencing the laying the new pipeline must be jointed to the already installed pipe. From the laying vessel it is, however, difficult to lay out the new pipe length exactly in line with and close to the already installed pipe length, and in most cases of resumed pipe laying there will occur an angular deviation between and an overlapping of the two ajoining pipeline ends.

When the pipe ends are to be jointed, e.g. by welding, the pipe ends are cut so that the distance therebetween adopts a suitable length, e.g., ½–1 meter, whereafter the pipe ends are aligned relative to each other and welded together by an intermediate pipe piece.

When a damaged pipeline is to be repaired it is usual to cut and remove the damaged pipe section, which thereafter is replaced by a new pipe piece which is welded to the respective pipe ends.

In connection with both the mentioned conditions it is known to use an alignment rig or frame, which usually comprises a welded, trussed structure having clamps or gripping means gripping around the pipe ends and moving these by hydraulic devices. The power to the driving means is supplied through a cable from a surface vessel which also carries the alignment frame prior to the lowering thereof to the jointing area of the pipe ends.

Most of the pipe alignment rigs have very large dimensions and are generally equipped with means serving to affix the rig to the bottom of the sea.

Rigs for use in the alignment of pipe ends at the bottom of the sea are disclosed, e.g. in Norwegian Pat. NP No. 134 315, U.S. Pat. No. 3,508,410 and West German Pat. No. 1 934 884. Thus from Norwegian Pat. No. 134 315 there is known a device for use in connection with the jointing of pipes at the bottom of the ocean, comprising a frame open towards the bottom, which frame is lowered from a carrier vessel to bridge the pipeline ends, and which is equipped with displacable gripping means which can grip around the pipe ends and by hydraulic jacks displace the ends relative to each other to a suitable welding position. However, the hydraulic jacks provided on the frame according to Norwegian Pat. No. 134 315 have a very limited stroke compared to the width of the frame or the rig, the clamps gripping around the pipe ends being arranged with pairs of opposite power cylinders which combined occupy more than one third of the width of the frame. In connection with pipe ends which are spaced far apart and which therefore require a rig having hydraulic power cylinders with a long stroke, a rig constructed according to the teaching of Norwegian Pat. No. 134 315 must be made disproportionately large, the weight of the rig increasing considerably. This will further entail that the crane equipment on the surface vessel must be strengthen even more to cope with the raising and lowering of the large weights represented by such a known pipe positioning rig.

In Norwegian Pat. No. 134 315 even the use of a frame which favourably has a very substantial weight, is suggested, so as to provide a stable foundation. To achieve additional stability of the frame the use of piles affixing the frame to the bottom of the ocean have been suggested according to said patent specification. However, such an affixing of the frame will render a setting-up of the pipes which to a substantial degree depends on the fixed working position adopted by the frame relative to the pipe ends. Such a setting-up may give unwanted, large deformations in the pipe ends, which is unfavourable to a later welding operation.

SUMMARY OF THE INVENTION

An object of the present invention is to arrive at a method for aligning two pipeline ends, which may be carried out with a relatively simple and light rig, said rig not being encumbered with the stroke limitations for the hydraulic cylinders described above in connection with known rigs.

Another object of the present invention is to give instructions for a method for aligning two pipeline ends, wherein the pipe ends during the course of the alignment are subjected to minimum deformation per length unit, and wherein the finished aligned pipe ends adopt a position giving minimum tension in the pipes.

In accordance with the invention, in a method of the type described in the preamble, these objects are achieved by aligning the pipes whilst allowing the frame to be displaced relative to the bottom.

In a method for aligning two submerged pipeline sections by using a frame open towards the bottom of the sea, which frame is brought in position in the area of the pipe section ends and which for each pipe end is equipped with a set of holding fulcrum means displacable relative to the frame for coming into engagement with the pipe ends, a first holding/fulcrum means in each set functions as a restraining force for the respective pipe end, and a second holding/fulcrum means is operable for displacement and alignment of the pipe end. The improvement comprises that the displacement and the alignment of the pipe ends by the holding/fulcrum means is carried out at the same time as the frame is allowed to be displaced relative to the bottom and the pipe ends. The restraining forces which develop when the holding/fulcrum means are engaged with the pipe ends and induce an alignment force thereonto being utilized for the displacement of the frame relative to the bottom and the pipe ends, so that the frame and the pipe ends can adopt a relative position whilst forming a funished aligned pipeline curve having as large a radius of curvature as possible.

Thus, the present invention permits the alignment rig to follow the movements of the pipe ends during the alignment operation. When the frame is unwantedly wedged to the bottom or the base or when such large friction between the base and the frame parts resting thereon exists that the frame is prevented from being displaced along the bottom, the frame may be raised for being released from the base. The raising of the frame may be accomplished either by the introduction of air in the frame structure or by lifting the frame on the pipe ends.

An apparatus for carrying out such a method for aligning two pipeline ends, preferably two pipeline ends located on the bottom of the sea, comprises a frame open towards the bottom of the sea, which is brought in position to bridge the pipeline ends, and which is equipped with means for displacing and aligning the pipe ends which act as the above holding/fulcrum means, and is according to the invention characterized in that the frame is provided with means which during operation of the alignment means for aligning the pipe ends permit the frame to be displaced relative to the bottom or the base.

An appropriate embodiment of the apparatus of the invention is to the effect that the frame comprises a main beam which is connected to two mainly U-shaped bridges forming supporting legs for the apparatus and two carrying beams extending from the main beam, and that the supporting legs and possibly the main beam at their lower ends are provided with and rest on friction reducing gliding surfaces. On each carrying beam there may then be provided a drivable waggon which carries a rigid raisable and lowerable rod which at its lower end is provided with a holding means, said holding means via a flexible connection being connected to a power cylinder on the main beam. On the portions of the bridges positioned on the same side of the frame as the main beam there may then be provided adjustable abutments, said abutments being swingable and tiltable and connected with means for raising and lowering the abutments. In an alternative embodiment of the apparatus of the invention each of the displacement/aligning means may be designed in the same manner as the above described holding means, i.e. arranged on a rigid raisable and lowerable rod mounted on a waggon displacable transversely to the frame.

A feature of the apparatus of the invention consists in that the frame is constructed from hollow structure means allowing the introduction of air, so that the frame may be raised and displaced a distance above the base during the alignment operation.

In an alternative embodiment of the apparatus of the invention each of the displacement/alignment means may comprise a preferably horizontal and a preferably vertical power cylinder which at the one end is pivotably and rotatably attached to the frame and at the other end is attached to controllable pipe holding means, all of the horizontal power cylinders being mounted on the same side of the frame and all of the vertical power cylinders being attached approximately at the middle of the frame.

A still further feature of the subject matter of the present invention consists in that the displacement/alignment means is mounted on adjustable attachment means, so that an after-adjustment of the aligned pipes may be carried out for compensation of for example different outer pipe diameters.

Further, the adjustable attachment means may be so designed that they can be controlled from a welding habitat which is provided on the frame and which is lowered to cover the aligned pipe ends for the welding thereof.

Suitably, the displacement/alignment means may be equipped with locking means serving to lock the aligned pipe ends in a fixed position over a longer span of time.

In the following the invention will be further described, reference being had to the drawing, which illustrates various embodiments of the apparatus according to the invention and renders intelligible how the method according to the invention may be carried out.

BRIEF DESCRIPTION OF THE DRAWINGS

FIG. 1 is a schematic view illustrating two pipeline ends resting on the bottom of the sea.

FIG. 2 is a schematic view of two pipeline ends on the bottom of the sea, each supported by a trestle.

FIG. 3 is a schematic plan view which illustrates a first embodiment of the pipe alignment rig of the invention, in which the rig is positioned across two pipeline ends for the alignment thereof.

FIG. 4 is a plan view similar to FIG. 3 and illustrates the alignment operation at an advanced stage.

FIG. 5 is a plan view similar to FIGS. 3 and 4 and illustrates the apparatus and the pipeline ends in the final position when the alignment operation has been completed.

FIG. 6 shows schematic section taken along the line 6—6 in FIG. 3.

FIG. 7 shows a schematic section taken along the line 7—7 in FIG. 3.

FIGS. 8 and 9 show schematic sections taken along the lines 8—8 and 9—9 in FIG. 4, respectively.

FIGS. 10 and 11 show schematic sections taken along the lines 10—10 and 11—11 in FIG. 5, respectively.

FIGS. 13 and 14 are a side view of and a section through, respectively, an embodiment of the type illustrated in FIG. 12.

DESCRIPTION OF PREFERRED EMBODIMENTS

Figure 12:
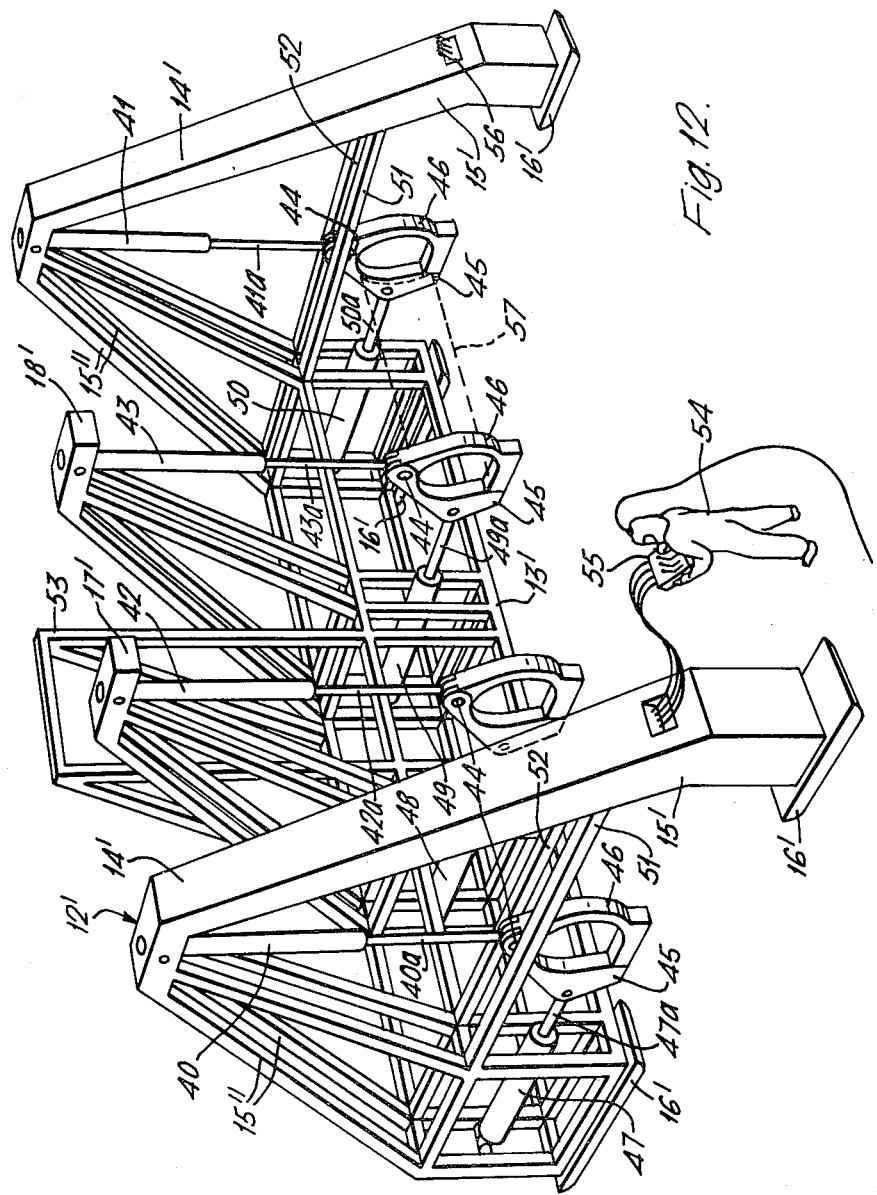
FIG. 12 is on a larger scale a perspective view which in more detail illustrates another embodiment of the subject matter of the invention.

Referring to FIG. 1 there is schematically illustrated two pipeline ends 1 and 2 resting on a base 3, e.g. the bottom of a sea or any larger body of water. The pipe ends 1, 2 when brought in line with each other, are to be jointed, preferably by welding therebetween an intermediate, not illustrated pipe piece.

Sub-surface welding operations usually take place in a sub-surface welding chamber or so-called habitat. If the pipe ends are placed directly on the sea bottom as illustrated in FIG. 1, this will necessitate a rather substantial digging under the pipe ends as indicated by the pit 4 to make room for the welding chamber.

When placing the pipe ends 1, 2 on trestles 5 and 6, respectively, and letting the pipe ends point somewhat downwards as this is indicated in FIG. 2, the digging in the ground below the pipe ends will not be necessary. In the further description it is assumed that the pipe ends 1, 2 are positioned on trestles 5, 6 as illustrated in FIG. 2.

In FIG. 3, 1 and 2 designate as before the two pipeline ends which are to be aligned and jointed, each of the pipeline ends being positioned on a trestle 5 and 6, respectively. By an auxiliary vessel or carrier vessel the pipe ends 1 and 2 which, for example, constitute the end section respectively and the starting section of respective pipeline lengths which have been installed at different times, are brought close to each other and as accurately on line with each other as the positioning equipment on the carrying vessel is capable of. Prior to being brought in the position illustrated in FIG. 3, the pipe ends 1 and 2 may comprise individual overlapping pieces 1' and 2', respectively, which are cut to give a distance between the pipe ends 1, 2 of approximately ½-1 m when the ends are brought in line with each other.

As illustrated in FIG. 3 the pipe ends 1, 2 are positioned at a distance A from each other, the pipe ends forming an angle α with each other subsequent to being placed on the trestles 5, 6. After the pipe ends 1, 2 have been brought in the position illustrated in FIG. 3, there will from a carrier vessel be lowered a pipe alignment rig which is manufactured in accordance with the present invention, and which in FIG. 3 is generally designated by 12.

The embodiment of the apparatus or rig 12 illustrated in FIGS. 3-9 comprises a main beam 13, which is rigid enough to absorb the forces occurring during the alignment of the pipe ends 1, 2. At each end of the main beam 13 there is attached a substantially U-shaped bridge 14, the legs 15 thereof together with the beam 13 resting on the bottom or the base 3, friction reducing means 16 in the form of plates or suitable gliding surfaces being provided on the leg portions resting on the bottom.

Between the bridges 14 there is on the main beam 13 provided two L-shaped carrying beams 17, 18 which at level with the bridges 14 extend along the complete width of the rig. On opposite side of the main beam 13 the bridges 14 are connected with each other by a beam 19 parallel to the main beam and also serving as a support for the carrying beams 17, 18.

On each of the bridges 14 there are mounted abutments 20, 21 each having a semicircle-shaped means 20a and 21a respectively, which is pivotably and tiltably attached to the bridge 14.

Aside from being pivotable and tiltable the abutments 20, 21 are provided with raising and lowering means serving for displacing the abutments along the vertical portion of the leg 15 of the bridge 14 closest to the main beam 13.

The semicircle-shaped means 21a of the abutment 21 is adapted to fit around the pipe end part 2, as illustrated in FIG. 6.

On each of the carrying beams 17, 18 there is provided a waggon 22 respectively 23, which may be freely displaced along its carrying beam. The waggons 22, 23 are identical, each of which carrying a rigid rod 24, 25 which at its lower end carries an articulated holding means 26, as illustrated in FIG. 7. The lower part 27 of the ring-shaped holding means 26 may be opened and closed by a not illustrated hydraulic cylinder. The rigid rod 24, 25 with its holding means 26 may be moved up and down in its respective waggon 22, 23 by a hydraulic power cylinder 26a mounted on the waggon. The holding means 26 is on the side facing the main beam 13 via a flexible connection 28 and a piston rod 29 connected to a hydraulic cylinder 30. The cylinder 30 in turn is pivotably supported on the main frame 13 and may be extension and retraction of the piston rod 29, drive the waggon 22, 23 with its cylinder 26a and the rod 24, 25 forth and back on the carrying beam 17, 18.

Between the carrying beams 17, 18 there is provided a welding chamber or so-called habitat 31 which by vertical guidings 32 and not illustrated hydraulic cylinders may be lowered to a suitable position across the pipe ends for the welding thereof when the alignment of the pipes has been carried out.

In the following, a method for aligning the pipeline ends by means of the apparatus 12 will be further described.

As mentioned, in their initial position the pipe ends 1, 2 are placed on the trestles 5, 6, so that the pipe ends are hanging somewhat down, as illustrated in FIG. 2. Seen from above the pipe ends 1, 2 are positioned as illustrated in FIG. 3.

The apparatus or the rig 12 is lowered from the carrying vessel possibly by means of guiding wires and is positioned across the pipe ends 1, 2 as illustrated in FIG. 3. During the lowering operation an effort is made to locate the longitudinal center line of the rig as close to half-way between the pipe ends 1, 2 as possible. In connection with a rig illustrated by the embodiments in FIGS. 3-9 i.e. with semicircle-shaped abutments 20, 21 mounted on either leg of the bridges 14, the hydraulic cylinders 30 of the rig must be positioned on that side of the pipe ends at which these form an acute angle.

When the rig 12 is brought in the position illustrated in FIG. 3, the power cylinders 30 and 26a are activated for maneuvering the holding means 26 for the closing and locking thereof about corresponding pipe ends 1 and 2, respectively.

By the cylinders 26a the pipes 1, 2 are lifted high enough for their center lines to be approximately at level with the center lines of the abutments, as this is best illustrated in FIG. 6. Thereafter, the cylinders 30 are activated so that the rig 12 and the pipe ends 1, 2 are pulled towards each other until the pipe ends 1, 2 rest against their respective abutment 20, 21. For the pipe end 2, this condition is best illustrated in FIG. 4 and by the sections depicted in FIGS. 8 and 9.

In FIG. 4 the cylinder 30 co-operating with the waggon 23 on the carrying beam 18 has reached its fully retracted position, the pipe end 2 resting against the abutment 21. The cylinder 30 cooperating with the waggon 22 on the carrying beam 17 still has a portion of the piston rod 29 extended, but also here the pipe end 1 has come to rest against its abutment 20. In FIG. 4 the rig 12 has taken another position than the starting position illustrated in FIG. 3, and this is due to the fact that the rig 12 during the activation of the cylinders 30 and thereby the waggons 22, 23 on the carrying beams 17 and 18, respectively, has been displaced along the bottom of the sea 3 for thereby taking a most favourable position as regards the conditions of tension in the individual pipelines 1, 2.

The cylinder 30 thereafter continues to pull the waggon 22 on the carrying beam 17 and thereby the pipe end 1 in the direction towards the main beam 13 until the holding means 26 on the respective rods 24, 25 and the abutments 20, 21 on the respective bridges are positioned so to say on a straight line in the horizontal plane. Eventual height adjustments of the holding means 26 for letting the center lines thereof coincide with the straight line in the horizontal plane are effected by the cylinders 26a on the waggons 22, 23.

When the cylinders 30 are activated for the alignment of the pipe ends the rig 12 and the pipe ends 1 and 2 will be mutually displaced so that the pipe ends 1, 2 in the final aligned position form a very gently curved arc through the rig 12, as this is illustrated in FIG. 5. Here, both the cylinders 30 are illustrated with their piston rods 29 in fully retracted position, both the pipe end 1 and the pipe end 2 resting against their respective abutment 20, 21.

During the alignment of the pipes it may be chosen whether the pipes are to be swung about the trestles as pivot points or glide sideways therealong or theretogether. The last alternative requires less power and renders a more gently curved arc on the finished aligned pipe. This last alternative is sought illustrated in FIGS. 3-11.

If the rig 12 during the aligning procedure of the two pipe ends 1, 2 should wedge and thereby be unable to be displaced relative to the pipe ends, or if the rig should offer too large frictional resistance against sliding along the base, some of the weight of the rig may be transferred to the pipe ends by the hydraulic cylinders 26a, possibly in connection with additional support of the pipe ends in this area.

The rig may also be made lighter by filling sections of the structure with air which via conduits (not shown) is supplied to the rig from a carrier vessel on the surface.

When the pipe ends 1, 2 have been adjusted accurately on line with each other by the cylinders 26a and 30, the pipe ends are locked to the rig structure by not illustrated, positive locking devices.

If the pipe ends, for example due to eccentricity in the concrete layer or damages thereof, have not come quite in line when all the horizontal and vertical cylinders have attained their locked position, the cylinders may be provided with means for fine adjustment of the relative position of the pipe ends. For example, the two central horizontal and vertical cylinders may be suspended in hydraulically driven mechanical screw jacks which are self-locking and allow a certain displacement forth or back of the attachment points of the horizontal cylinders and a corresponding displacement up or down of the attachment points of the vertical cylinders. This fine adjustment may advantageously be carried out from the habitat when it is lowered on the pipe ends.

The habitat or the welding chamber 31 is lowered to a working position, as this is illustrated in FIG. 11, and sealing of the pipe ends as well as welding of the pipe piece, examination of the welds and covering of the joint can thereafter be carried out in usual manner within the chamber 31.

When the jointing operation has been completed, the welding chamber 31 is returned to its raised position, and the above discussed locking means are inactivated. Thereafter, the rig is pushed back from the finished jointed pipeline by the cylinders 30, so that the pipe clears the abutments 20, 21, whereafter the holding means 26 are opened, and the rig 12 is lifted off. Then the pipe is lifted from the trestles 5, 6 which are removed for allowing the pipes to be placed on the sea bottom 3.

A method corresponding to the one described above can also be used if the pipe ends 1, 2 rest direct on the bottom of the ocean, as this is illustrated in FIG. 1. However, in connection with such a method a larger power is required to dislocate the rig due to friction between the pipe and the bottom, but also in this case the pressure of the rig towards the base may be made less, either by the hydraulic cylinders 26 or by structure sections having variable buoyancy.

It is to be understood that the described alignment apparatus can be reduced to practise in other ways without departing from the scope of the invention. For example, the abutments 20, 21 may be designed as holding means in the same manner as the above described holding means 26, said means being attached to a rigid rod which is carried by a waggon which can be displaced along the upper part of the bridge 14, and which is connected to cylinders flexibly attached to the one side of the holding means. If the abutments are mounted on displacable waggons in the same manner as the holding means 26, there is no need to displace the rig until the pipe ends come to rest against the abutments. The abutments can then simply be adjusted for fitting to the pipes in their original position without a displacement of the rig. The abutments or the holding means are then displaced by cylinders and can together with the cylinders displacing the remaining holding means positively contribute to the final alignment of the pipe ends.

The alignment apparatus or the rig can also be designed in the manner illustrated in FIGS. 12, 13 and 14. Thus, FIG. 12 illustrates in more detail how a second embodiment of the invention may be implemented, whereas FIGS. 13 and 14 diagramatically illustrate respectively a side view of and a section through such an embodiment of the pipe alignment apparatus of the invention.

In FIGS. 12-14, 12' designates the rig itself, which comprises a main beam 13' constructed as a trussed structure by welded, rectangular, hollow profiles. At each end of the main beam 13' there is provided a bridge 14' which on the side located farthest from the main beam 13' has a leg 15' resting on a base and at the end closest to the main beam has a leg 15'' attached to said beam 13'. On the parts of the bridges 14' and the main beam 13' which rest on the base, there are provided friction reducing means 16', e.g. in the form of plates which are bent at each end and provided with suitable gliding surfaces.

Between the bridges 14' there is on the main beam 13' provided two cantilevers or carrying beams 17', 18' which contrary to the carrying means discussed in connection with the embodiment illustrated in FIGS. 3-11, only extend a distance from the main beam 13', preferably approximately to the half of the rig width.

On each of the bridges 14' and on each of the carrying beams 17', 18' there is mounted a power cylinder 40, 41 and 42, 43, each of which being pivotably and rotatably mounted at their upper end. Each of the power cylinders 40-43 carry at the end of their cylinder rod 40a, 41a, 42a and 43a, respectively, a holding means 44 consisting of two substantially semicircle-shaped members 45 and 46 which can be spaced and closed to a ring for encircling the pipe which is to be aligned by the rig 12'. Means for opening and closing the holding means 44 are not illustrated for the sake of simplicity. In addition, the rig 12' comprises four substantially horizontal power means 47-50 mounted in the main beam 13', each of the power means 47-50 at their one end being pivotably and rotatably mounted in the outer side of the frame, whereas the piston rods of the means 47a, 48a, 49a and 50a, respectively, are attached to respective members 45 of the holding means 24.

For guiding the two outermost holding means 44 pairs of parallel beams 51, 52 are provided in the area of the bridges 14', which in addition to serving as guiding means also serve for stiffening the frame structure 12'. Besides, the frame is equipped with a stillage 53 for supporting and guiding a not illustrated welding habitat.

Illustrated in FIG. 12 is a diver 54 at one of the bridges 14', which by a controlling means 55 carries out the functions necessary for an alignment operation of pipe ends in deep water. A second controlling means 56 is illustrated on the second bridge 14'. Preferably the controlling means 55 may be used for controlling the power means 40, 42 and 47, 48, whereas the controlling means 56 can be used for controlling the remaining power means, i.e. the means 41, 43 and 49, 50.

It is to be understood that the holding means 44 not necessarily must comprise four separate units, but that these may be built together so as to utilize only two holding means for the pipe alignment operation which is to be carried out by the frame 12'. Such an alternative embodiment of the holding means 44 is indicated with dotted lines in FIG. 12, the holding means members 45 to the right in FIG. 12 being interconnected by a curved piece 57 which together with the members 45 constitute an elongated abutment for the pipe ends to be aligned during the working operation. It is to be understood that corresponding arc-shaped pieces may also be provided between the members 46 of the holding means 44, a fact which entails that the pipe ends during the alignment operation and by closed holding means are enclosed in a pipe-shaped body. Alternatively the curved connection piece 57 may be so designed that it by suitable means can be displaced between the members 45 and the members 46 depending on which side of the pipe ends the alignment force will be transferred.

In FIG. 13, which is a diagramatic side view of an embodiment of the subject matter of the invention similar to that illustrated in FIG. 12, the "horizontal" power means 47 is as an example illustrated in a fully extended slightly sloping position, the holding means 44 being clamped around a pipe 2'. In this position of the power means 47 the corresponding "vertical" power means 40 takes an oblique position given by the position of the pipe relative to the frame members 13' and 14'. At the same time as the power means 47 and 40 take the positions illustrated in FIG. 13, the power means 42 and 48 may assume their resting position, all of the power means of the frame being controlled individually. In FIG. 14 the other power means, e.g. the means 43 and 49, are shown in their basic position, i.e. with the piston rods 43a and 49a, respectively, in fully retracted position, a fact which involves that the holding means 44 is as close to the main beam 13' as possible.

The rig according to the invention may be designed as a very light structure compared with known structures of similar type. Since the rig is adapted to being displaced relative to the base whilst the alignment operation takes place, the hydraulic cylinders effecting the alignment forces, may be dimensioned optimally. In addition, the rig of the present invention offers the advantage that almost the complete width of the rig may be utilized as a stroke area for the hydraulic power cylinders pulling the pipe ends into correct position. The relatively low weight of the rig facilitates the maneuvering of the rig when this is to be put in position across the pipe ends and contributes to making the hoisting machinery on the carrying vessel far cheaper due to the lower loading capacity.

Further, the rig of the invention offers the advantage of aligning the pipes to a position in which the deformation per length unit of the pipes and the pipe tension can be reduced to a minimum.

Of course, the rig according to the invention may be carried out in many other ways without departing from the scope of the invention. For example, the friction reducing means may be designed not only as gliding surfaces, but also as rollers, wheels, belts or similar. Further, the frame may be provided with hollow structure members allowing the introduction of air, so as to raise and displace the frame a distance above the base during the alignment operation. If desired the rig may be equipped with separate, controllable buoyancy tanks. It is also to be understood that the power means described in connection with the embodiment of FIG. 12 may be mounted in adjustable attachment means, so that an after-adjustment can be undertaken for the aligned pipe for compensation of for example a different outer pipe diameter. Preferably, the frame may then be provided with means for controlling the adjustable attachment means from the welding habitat.

As mentioned above the pipes may either be displaced along the bottom or they may be displaced on trestles gliding along the bottom. In that case the trestles may be provided with gliding rails affording a small friction against the base. Alternatively the trestles may be provided with belts, rollers or similar devices for facilitating the movement on the base. When using trestles gliding along the bottom, these may suitably be provided with means for being hooked on the pipe ends whilst these are lifted from the base. The hooking means may then be so adapted that after the hooking of the trestles onto the pipes the trestles are allowed to swing in correct position below the pipes.

What we claim is:

1. In a method for aligning two pipeline sections submerged in the sea by using a frame open towards the bottom of the sea, which frame is brought into position in the area of the pipe section ends and which for each pipe end is equipped with a set of holding/fulcrum means displaceable relative to the frame for coming into engagement with the pipe ends, a first holding/fulcrum means in each set functioning as a restraining force for the respective pipe end, and a second holding/fulcrum means being operable for displacement and alignment of the pipe end, comprising displacing and aligning the pipe ends by the holding/fulcrum means and at the same time allowing the frame to be displaced realtive to the sea bottom and the pipe ends, by engaging the holding/fulcrum means with the pipe ends and applying a force to align the pipe ends, and utilizing the restraining forces which are produced by said alignment force for displacing the frame relative to the sea bottom and the pipe ends, so that the frame and the pipe ends can adopt a relative position whilst forming a finished aligned pipeline curve having as large a radius of curvature as possible.

2. The method as claimed in claim 1, and further comprising raising the frame from the sea bottom by the introduction of air into the frame structure when there is excessive friction between the frame and the sea bottom.

3. The method as claimed in claim 1, and further raising the frame from the sea bottom by lifting the frame on the pipe ends.

4. The method as claimed in claim 1, wherein the pipes are dislocated along the bottom.

5. The method as claimed in claim 1, and further comprising supporting the pipes on trestles arranged outside the frame.

6. The method as claimed in claim 1, wherein the pipes are attached at points outside the frame during the alignment.

7. Apparatus for aligning two pipeline ends located at the bottom of the sea, comprising a frame open towards the bottom of the water, which is brought in position above the pipeline ends and which is equipped with a set of holding/fulcrum means displaceable relative to the frame for coming into engagement with the pipe ends, a first holding/fulcrum means in each set functioning as a restraining force for the respective pipe end, and a second holding/fulcrum means being operable for displacement and alignment of the pipe end, the frame comprising a longitudinally extending main beam, a two-legged bridge connected to each end of said main beam, two cantilever beam members between the bridges connected to and extending from the main beam approximately to the middle of the frame, each bridge and cantilever beam member being provided with a displacement/alignment means comprising a substantially horizontal and a substantially vertical power cylinder one each of which is at one end pivotably and rotatably attached to one of said bridges and cantilever beam members, and at the other end has attached thereto a controllable pipe holding means, all horizontal power cylinders being arranged on the same side of the frame and all vertical power cylinders being attached to the frame approximately at the centre thereof, the displacement/alignment means of the cantilever beam members being adapted for displacement beyond the width of the frame in a direction opposite to the main beam.

8. The apparatus as claimed in claim 7, wherein pairs of said displacement/alignment means are held together by a curved connection piece.

9. The apparatus as claimed in claim 7, wherein pairs of displacement/alignment means are held together by two curved connection pieces, which in closed position of the pieces define a pipe-shaped holding means.

10. The apparatus as claimed in claim 7, wherein the displacement/alignment means are designed with mechanical locking means locking the aligned pipe ends in a fixed position over a longer span of time.

11. The apparatus as claimed in claim 7, wherein said displacement/alignment means are mounted in adjustable attachment means so as to allow an after-adjustment of the aligned pipes for compensation for different outer pipe diameters.

12. The apparatus as claimed in claim 11, wherein the adjustable attachment means may be controlled from a welding habitat which is located on the frame and which may be lowered down onto the aligned pipe ends.

* * * * *